Figure 1:
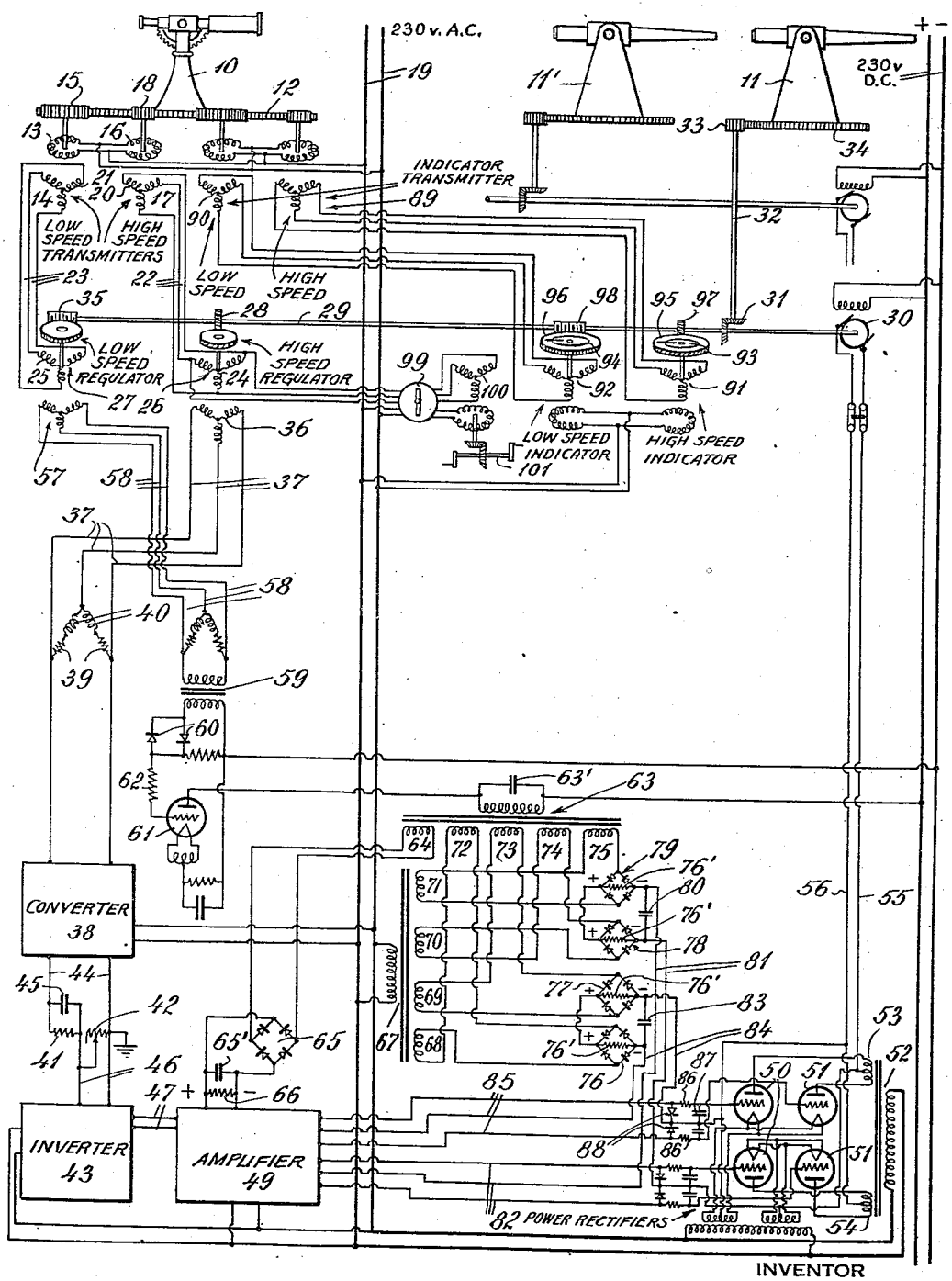

Oct. 22, 1946.              G. AGINS                2,409,970
                  ELECTRICAL POSITION CONTROL SYSTEM
                       Filed May 9, 1936           2 Sheets-Sheet 1

INVENTOR
George Agins
BY
Hoguet, Neary & Campbell
ATTORNEYS

Oct. 22, 1946. G. AGINS 2,409,970
ELECTRICAL POSITION CONTROL SYSTEM
Filed May 9, 1936 2 Sheets-Sheet 2

INVENTOR
George Agins
BY
Arquit, Leary & Campbell
ATTORNEYS

Patented Oct. 22, 1946

2,409,970

UNITED STATES PATENT OFFICE 2,409,970

ELECTRICAL POSITION CONTROL SYSTEM

George Agins, Brooklyn, N. Y., assignor to Arma Engineering Co., Inc., Brooklyn, N. Y., a corporation of New York Application May 9, 1936, Serial No. 78,944

15 Claims. (Cl. 172—239)

This invention relates to electrical position control systems and has particular reference to a fully electrical system for positioning a gun in accordance with corresponding movements of a remote observation instrument, such as a director, although the invention is not limited to that use.

In order to position one or more guns in accordance with observed data for direction upon a selected target with any degree of accuracy, it is not only necessary to actuate the gun in elevation and train, but it is essential that that be done rapidly and with a degree of precision which is absolute, considering the mass, inertia and momentum of the heavy gun mount parts which must be moved. This requires that the control system be sensitive to small movements of the director and at the same time sufficiently powerful to respond rapidly and accurately in order to attain the desired object.

In accordance with the present invention, a fully electrical position control system, especially adapted for positioning guns in accordance with the movements of a remote director, is provided, the system described herein being adapted to position a gun mount in train, it being understood that the system is substantially duplicated for positioning the gun in elevation and/or depression.

More particularly the present invention comprises high and low speed transmitters, preferably of the self-synchronous type, actuated by movements of the director in train for energizing one element of corresponding synchronous differential generators or regulators, the other or movable element of which is operatively connected to the gun mount and displaced relatively to the first element in accordance with the deviation between the gun mount and the director in train. The resultant differential voltage signal induced in the high speed regulator is proportional to the degree or angle of such deviation and its phase depends upon the direction of such deviation.

This signal voltage is rectified and a damping component added when the signal fluctuates, so that a direct current voltage is produced having a polarity corresponding to the phase of the regulator signal and having a magnitude proportional to the sum of the regulator signal and the time rate of change of the regulator signal. This direct current voltage is converted into an alternating current voltage of corresponding phase and proportional magnitude, is amplified, is introduced into the grid circuit of one of two independent control rectifiers, depending upon the direction of the deviation of the gun mount, and the output of the selected rectifier is impressed at corresponding polarity on a direct current power motor operatively connected to the gun mount for moving it in train in the direction and through the angle of movement of the director.

Although the high speed control described is highly sensitive and accurate, it derives these advantages in part from a prerequisite of continuous substantial agreement between the director and the gun mount, so that, for larger angles of deviation, the gun mount must be brought into such substantial agreement or synchronism. It is the function of the low speed regulator to secure such synchronism and this regulator responds to greater deviation angles by impressing a blocking voltage on the high speed amplifier for temporarily nullifying the high speed signal, and simultaneously applying to the grid circuit of the selected power rectifier a voltage of proper phase to cause the latter to energize the power motor for restoring the gun mount to synchronism with the director. The follow-up movement of the gun mount restores the rotors of the high and low speed regulators to neutral or non-inductive position. Means are provided for substituting local power hand control for the director control and for indicating at any selected remote point the relation between the director and gun mount.

It will be seen that with the gun position control system of this invention, all of the advantages of sensitivity and accuracy generally characteristic of fully electrical control means are realized, and that at the same time a simple, positive and rugged control system is provided.

Figure 2:
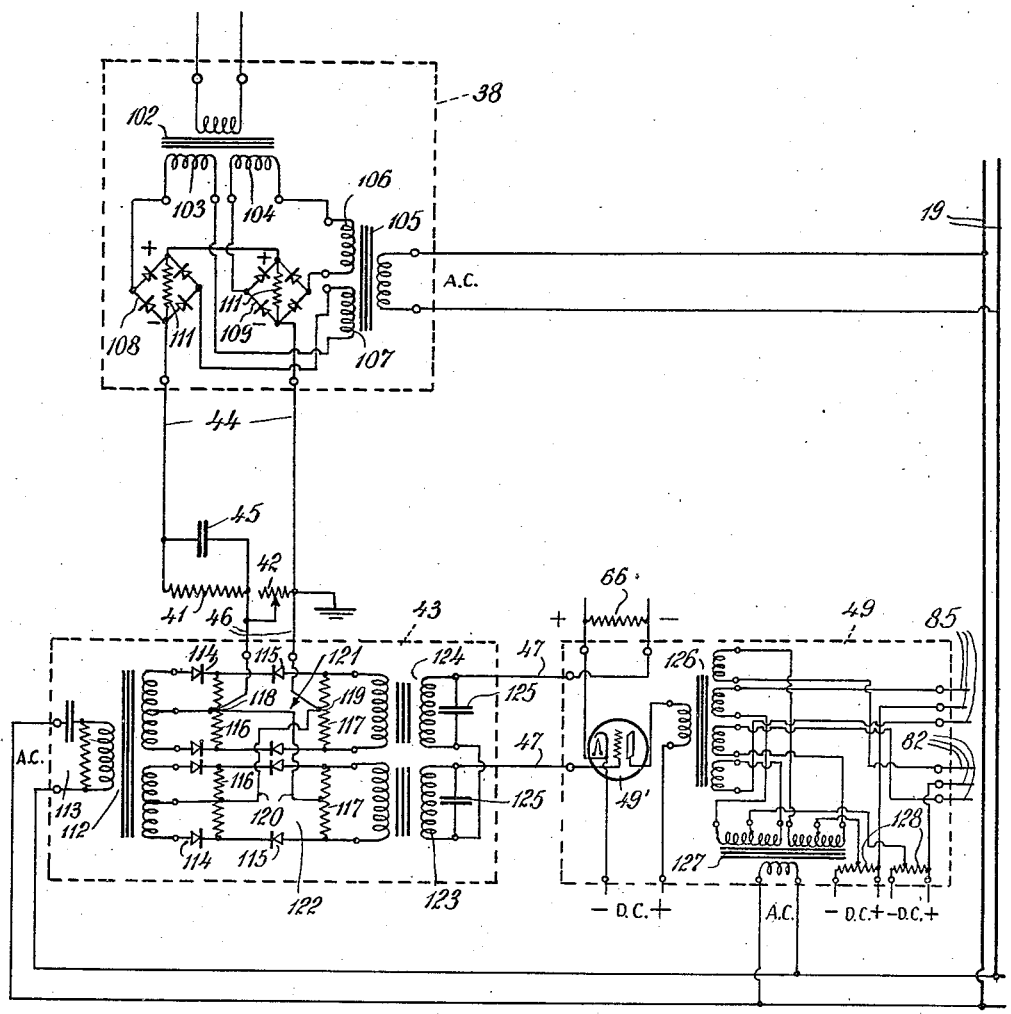

For a more complete understanding of the invention reference may be had to the accompanying drawings in which Figure 1 illustrates diagrammatically the electrical and mechanical arrangement of the electrical position control system of this invention, and Fig. 2 illustrates the preferred arrangement of the signal converter, inverter and amplifier.

Referring to Fig. 1, numeral 10 designates an observation instrument such as a director, which is adjustable in elevation and train to follow a relatively moving target. The gun mount 11 is so connected to the director 10 by the position control system of this invention as to automatically follow the movements of the director, only its movement in train being described herein, it being understood that for elevation and/or depression the system is substantially duplicated.

The director may be mounted on a turntable having the ring gear 12 for driving the rotor 13 of the low speed transmitter 14 by means of pinion 15, and the rotor 16 of high speed transmitter 17 by means of pinion 18. The gear ratio of the high and low speed transmission system, which is preferably of the self-synchronous type with the rotors 13 and 16 energized from the 230 volt, 60 cycle alternating current supply 19, is preferably 36 to ½, although any other suitable speed ratio may be employed. The high speed transmission system is provided for sensitivity, and the low speed system for synchronizing the director 10 and gun mount 11 for control by the high speed system.

The three-phase stator windings 20 and 21 of the respective high and low speed transmitters 17 and 14 are connected by respective wires 22 and 23 to the rotors 24 and 25 of the 36 speed and ½ speed synchronous regulators or differential generators 26 and 27, respectively. The rotor 24 of high speed regulator 26 is connected by suitable spiral gearing 28 to the shaft 29 of the gun mount train power motor 30. This motor 30 is connected by bevel gears 31, shaft 32 and pinion 33 to the ring gear 34 of the gun mount 11 for positioning the latter in train in accordance with the signal impulse of the director transmission system, including a damping component and corrections for parallax and the like. Similarly, the rotor 25 of low speed regulator 27 is connected to power shaft 29 by appropriate speed-reducing worm gearing 35.

The three-phase windings of the stator 36 of the high speed regulator 26 are connected by wires 37 to a converter 38 for converting the regulator output of alternating voltage of varying amplitude and reversible phase into a direct current voltage of proportional magnitude and reversible polarity. The converter 38 may be of any desired construction, such as the arrangement illustrated by parts 63 to 79, inclusive, in Fig. 1. However, in the interest of simplicity, the construction of the converter 38 is repeated in detail in Fig. 2 and may comprise an input transformer 102 connected to the output of high speed regulator 26 and having two secondary windings 103 and 104, a bias transformer 105 supplied from the alternating current source 19 and having two secondary windings 106 and 107, and two corresponding rectifier bridges 108 and 109 with loading resistors 111 and connected in series with the secondary windings 103, 107 and 104, 106, respectively. These rectifier bridges 108 and 109 are so connected that the fixed alternating current voltage in the secondary circuits of 106 and 107 is added to the signal voltage in one bridge and subtracted from that in the other bridge, depending upon the direction of deviation between director 10 and gun mount 11. The resulting proportional direct current voltages are opposed and the voltage output of the converter 38 has a magnitude and direction determined by the difference between the voltage output of the bridges 108 and 109 and will reverse as the phase of the input signal reverses. When the deviation between director 10 and gun mount 11 is zero, the voltage output of the rectifier bridges 108 and 109 is equal and thus they nullify each other, so that the voltage output of the converter is zero. Only one phase of the high speed regulator 26 output is supplied to the converter 38, the other two phases being balanced by resistances 39 and inductances 40.

To the output of the converter 38 is automatically added a damping component proportional to the time rate of change of the high speed regulator 26 signal. This damping component is introduced by resistances 41 and 42 and the resistance of the inverter 43, to which the output leads 44 of the converter 38 are connected. Thus, for steady signals the converter output voltage is determined by the resistances 41 and 42, acting as a potential divider, the resistance 42 being adjustable and serving as a sensitivity control. For changing signals, the charging current for condenser 45 across resistance 41, which flows through resistance 42 and the inverter 43 resistance in parallel, acts to increase or decrease the voltage across the inverter input 46 by an amount depending upon the direction and rate of change of the signal voltage, so that the inverter input is a voltage proportional to magnitude of the signal voltage, which is proportional to the relative displacement of director 10 and gun mount 11 for small angles, plus the product of the ratio of resistances 41, 42 times the rate of change of the magnitude of the signal voltage, or a damping voltage, which is proportional to the relative velocity of the gun mount 11 and director 10 for small angles.

The inverter 43, which is preferably of the form disclosed in copending application Serial No. 73,852, filed April 11, 1936, by applicant, functions to change the variable current voltage input into an alternating voltage of a magnitude proportional to the input signal and whose phase reverses as the polarity of the input signal reverses. Although the inverter 43 is completely described in said copending application, in the interest of clarity it will be described here by reference to Fig. 2, in which the inverter 43 comprises an input transformer 112, whose primary winding is supplied by alternating current source 19, preferably through a phase-shifting network 113, and which has two secondary windings connected to the networks 121 and 122, each including two sets of opposed rectifiers 114 and 115 and resistors 116 and 117 for transposing and combining alternate half-cycles in one such network 121, the other half-cycles being combined in the other such network 122. The opposing rectifiers or valves 115 are so arranged that the potential at terminals 118 and 119 to which input leads 46 are connected, is positive at one and negative at the other. The terminals 118 and 119 are reversedly connected by 120 to the corresponding terminals of the other network. The two networks 121 and 122 are connected to corresponding transformers 123 and 124, respectively, whose secondary windings are connected in opposition, so that the output of the inverter 43 is alternating current. Condensers 125 may be provided for improving the wave shape by by-passing the higher harmonics. Further details of the inverter 45 may be obtained upon reference to the aforementioned application.

Connected to the output leads 47 of the inverter is an amplifier 49 of suitable construction, such as that illustrated in Fig. 2 and including the vacuum tube 49' whose grid is directed to the output of the inverter 43 and whose output is connected through interstage transformer 126 in series with the plate. The secondary windings of transformer 126 are connected in the conventional way with sources of alternating and direct current grid bias, 127 and 128, respectively, and the inverter voltage is applied to the grids of corresponding pair of vacuum tube rectifiers 50 and 51, whose plate voltage is supplied by transformer 52, the center taps of the corresponding two secondary windings 53 and 54 of which are connected by respective wires 55 and 56 to direct current power motor 30 for energizing the same to rotate the gun mount 11 in the corresponding direction, depending upon which pair of the tubes 50, 51 controls.

The stator 57 of the low speed regulator 27 is connected by wires 58 through the step-up input transformer 59 to the rectifier network 60 and then to the grid of the vacuum tube amplifier 61 through resistance 62. The function of the network 60 is to delay the application of voltage to amplifier 61 for approximately one degree to either side of synchronism. In the rectifiers of the copper oxide type, the resistance to flow of current in the forward or conducting direction is high until the voltage per disc reaches a certain value. Use is made of this property to prevent the application of voltage to amplifier 61 until the voltage rises to that corresponding to a displacement of approximately one degree on either side of synchronism. The plate circuit of amplifier 61 includes the transformer 63, having five secondary windings, one of which, 64, supplies the rectifier bridge 65 whose direct current output is introduced through filter condenser 65' and resistance 66 into the grid circuit of the vacuum tube or tubes 49' of amplifier 49 in a conventional way. The polarity is such that with an increasing low speed signal of any phase, the negative bias for the amplifier tube 49' grid is increased to a point where the amplifier tube 49' is blocked and the output of the amplifier 49 is zero.

Transformer 67 is the low speed bias transformer with its primary winding energized by the same alternating current source 19 that energizes the stator 21 of the low speed transmitter 14, and with each of its four secondary windings, 68 to 71, severally connected to the remaining four secondary windings 72 to 75, of transformer 63 to control corresponding rectifier bridges 76 to 79, which are loaded with resistances 76'. The four secondary windings 72 to 75, of transformer 63 are similar to the primary winding. It will be observed that the polarities of secondary windings 70 and 71 of transformer 67 are reversed and direct, respectively, with regard to secondary windings 74 and 75 of transformer 63.

The two rectifier bridges 78 and 79 are connected in opposition with their total output filtered by condenser 80 and connected by wires 81 into the grid circuit 82 of one pair of rectifiers 50, 51. The rectifier bridges 76, 77 and condenser 83 are similarly connected by wires 84 into the grid circuit 85 of the other pair of rectifier tubes 50, 51, but at opposite polarity. Accordingly, as the voltage at 63 increases, due to the response of regulator 26 to a deviation between director 10 and gun mount 11 greater than the synchronizing angle, the grids of one pair of rectifiers 50, 51 become more positive and the grids of the other pair more negative. Condenser 63' is provided for adjusting the phase of the secondary windings 72 to 75 of transformer 63 to match the phase of the secondary windings 68 to 71 of transformer 67. The resistances 86 and condensers 87 regulate the phase of the rectifier grid voltage, and the condensers 87 also limit the transient surge voltages on the grids and thus prevent false response and operation of the rectifiers 50, 51. Rectifiers 88 also limit the voltage on the rectifier grids and thus prevent flashing of the inoperative rectifiers 50, 51 at maximum signal voltage.

In operation, assuming that the director 10 and gun mount 11 are approximately in synchronism, the high speed transmission system is in control and any movement of the director in train causes the high speed transmitter 17 to impress a voltage on the high speed regulator 26, which in turn applies a voltage to the converter 38, where it is converted into a direct voltage whose magnitude is proportional to the magnitude of the impressed alternating voltage and whose polarity reverses as the phase of the impressed alternating voltage reverses. The output of the converter is modified to introduce at 41, 42 a damping voltage which is proportional to the rate of change of the regulator signal, in the manner described. The input of the inverter 43 is a direct current voltage whose polarity follows the phase of the regulator signal and whose magnitude is proportional to the sum of the regulator signal and the time rate of change of the regulator signal, or in other words, whose magnitude is proportional to the sum of the relative displacement and relative velocity of the gun with respect to the director. The inverter 43 converts this voltage into an alternating current signal of a magnitude proportional to the input signal and whose phase reverses as the polarity of the input signal reverses. The phase of the alternating current signal is adjusted to that of the plate voltage of the rectifier tubes 50, 51, after being amplified at 49. The amplified current at proper polarity is impressed on the direct current power motor 30, which rotates in the proper direction to follow the movement of the director 10 and position the gun mount 11 accordingly. The rotation of the power motor 30, through the spiral gear connection 28, tends to restore the high speed regulator 26 rotor 24 to neutral position with respect to its stator windings, so that the voltage applied to converter 38 is reduced to zero.

If the high speed regulator 26 is selected to run at thirty-six speed, as described, the gun mount 11 can be brought into synchronism with the director 10 in any one of thirty-six positions, and the function of the low speed regulator 27 is to select the proper one of these positions. By way of example, if the speed of the low speed regulator 27 is one-half, as has been selected here, its speed is $\frac{1}{72}$ of the speed of the high speed regulator, so that there is a space of 360°/72 or 5°, 2½° on each side, within which the high speed regulator 26 is effective, and beyond which the low speed regulator 27 must assume control and bring the gun mount 11 within the synchronism range of the high speed regulator 26. Accordingly, in response to a displacement of the director 10 and the gun mount 11 of more than the synchronizing angle, or more than 2½° from center in the assumed example, the corresponding relative displacement of the low speed regulator rotor 25 from neutral position is sufficient to induce a relatively large signal to provide a voltage across 66 to block the grid-controlled amplifier 49 and remove the high speed signal from the grids of rectifiers 50, 51. At the same time, this low speed voltage provides a bias voltage across 81 and also across 84, one positive and the other negative, to energize the power motor 30 to turn the gun mount 11 in the proper direction to restore it within the 5° synchronism angle, where the high speed regulator 26 again assumes control.

Suitable limit switch mechanism for stopping the rotation of the gun mount 11 in either direction to avoid interference with adjacent objects, or to prevent driving of the mount 11 against its limit stops may be provided for breaking the corresponding grid circuit of the operating pair of rectifiers 50, 51, so that the gun mount cannot be driven further in the same direction but may be driven in the reverse direction.

Indicating high and low speed transmitters 89 and 90 are geared to the director 10 for actuating remote high and low speed receivers 91 and 92 to position respective dials 93 and 94 in accordance with the director 10 angle, while the corresponding bezel dials 95 and 96 are positioned by the respective spiral and worm gearing 97 and 98 on power motor shaft 29. The indices of the corresponding dials 93, 95 and 94, 96 are substantially in registry when the director 10 and gun mount 11 are in synchronism, any deviation being readily discernible.

Where two or more gun mounts 11 and 11', indicated in the drawings, are to be controlled from the director 10 in the manner described, the balancing impedances 39 and 40 eliminate the reaction on regulator or differential 26 of another regulator 26 geared to a second gun mount 11', in case of angular disagreement of the second gun mount with the first. As the connections for a second gun mount are the same as for one, it is not necessary to describe or illustrate them. For example, if the impedances 39 and 40 are omitted, then in the event of a deviation of the gun mount 11 with respect to the director 10, the transmitter 20 will be loaded in a manner depending on the deviation, thus affecting the voltages applied to another regulator 26 of a second gun mount, causing errors in the position of the second gun mount. However, by employing the balancing impedances 39 and 40 equal to the input impedance of the converter 38, the load on the transmitter 20 is independent of the position of the rotor of regulator or differential 26, thus eliminating the possibility of the reaction of one gun mount or the other.

For local power manual control, power selector switch 99 is adjusted to connect manual transmitter 100 to the high speed regulator 26, so that by manipulating cranks 101 geared to transmitter 100, the gun mount 11 may be positioned in train by the operator.

I claim:

1. In a control system for positioning a controlled object in accordance with a controlling object, the combination of a driving motor for the controlled object, means responsive to predetermined positional disagreement between said objects for developing a voltage proportional to the degree of such disagreement, means for applying said voltage to the driving motor for actuating it to move the controlled object into positional agreement with the controlling object, second means responsive to a positional disagreement between said objects in excess of the said predetermined disagreement for nullifying said voltage and impressing on said voltage-applying means a different voltage to move the controlled object to the said predetermined positional disagreement for assumption of control by said first responsive means, and means directly responsive to the rate of change of either of said voltages for modifying the same to effect damping of the movement of the controlled object.

2. In a control system for positioning a controlled object in accordance with a controlling object, the combination of a driving motor for the controlled object, means responsive to a predetermined positional disagreement between said objects for developing a voltage proportional to the degree of such disagreement, means for normally applying said voltage to the driving motor to move the controlled object into positional agreement with the controlling object, second means responsive to a positional disagreement between said objects in excess of the said predetermined disagreement for developing a voltage, means for blocking the said voltage of said first responsive means with the voltage of said second responsive means and simultaneously impressing the said voltage of said second responsive means on said voltage-applying means to energize said motor to move the controlled object to the said predetermined positional disagreement for assumption of control by said first responsive means, and means responsive to the rate of change of one of said voltages for modifying the same to effect damping of the movement of the controlled object.

3. In a control system for positioning a controlled object in accordance with a controlling object, the combination of a driving motor for the controlled object, means responsive to a predetermined positional disagreement between said objects for developing a voltage proportional to the degree of such disagreement, an amplifier for the said voltage, means for normally applying the output voltage of the amplifier to the driving motor to move the controlled object into positional agreement with the controlling object, second means responsive to a positional disagreement between said objects in excess of the said predetermined disagreement for developing a voltage proportional to the degree of such greater disagreement, means for disabling said amplifier with said voltage of said second responsive means and simultaneously impressing the said voltage of said second responsive means on said voltage applying means to energize said motor to move the controlled object to said predetermined positional disagreement for assumption of control by said first responsive means, and means responsive to the rate of change of one of said voltages for modifying the same to effect damping of the movement of the controlled object.

4. In a control system for positioning a controlled object in accordance with a controlling object, the combination of a driving motor for the controlled object, means responsive to a predetermined positional disagreement between said objects for developing a voltage proportional to the degree of such disagreement, means for normally applying said voltage to the driving motor to move the controlled object into positional agreement with the controlling object, second means responsive to a positional disagreement between said objects in excess of the said predetermined disagreement for developing a voltage, means controlled by said second responsive means for impressing the substitute voltage of said second responsive means on said voltage applying means to energize said motor to move the controlled object to the said predetermined positional disagreement for assumption of control by said first responsive means, and means responsive to the rate of change of one of said voltages for modifying the same to effect damping of the movement of the controlled object.

5. In a control system for positioning a controlled object in accordance with a controlling object, the combination of a driving motor for the controlled object, means responsive to a predetermined positional disagreement between said objects for developing a voltage proportional to the degree of such disagreement, a grid-controlled thermionic amplifier for said voltage, means for applying the amplified voltage to the driving motor to move the controlled object into positional agreement with the controlling object, second means responsive to a positional disagreement between said objects in excess of the said predetermined disagreement for developing a voltage, means for impressing the voltage of said second responsive means in the grid circuit of said amplifier to block the latter, means for impressing the voltage of said second responsive means on said voltage-applying means to energize the motor to move the controlled object to said predetermined positional disagreement for assumption of control of said first responsive means, and means directly responsive to the rate of change of either of said voltages for modifying the same to effect damping of the movement of the controlled object.

6. In a control system for positioning a controlled object in accordance with a controlling object, the combination of a driving motor for the controlled object, means responsive to a predetermined positional disagreement between said objects for developing a voltage proportional to the degree of such disagreement, a thermionic relay having a control electrode connected in the output circuit of said responsive means, means for applying the output voltage of said relay to the driving motor to move the controlled object into positional agreement with the controlling object, second means responsive to a positional disagreement between said object in excess of the said predetermined disagreement for developing a voltage, and means for impressing the voltage jointly on said control electrode to block the operation of said relay and on said voltage-applying means to move the controlled object to said predetermined positional disagreement for assumption of control by said first responsive means.

7. In a control system for positioning a controlled object in accordance with a controlling object, the combination of a driving motor for the controlled object, means responsive to a predetermined positional disagreement between said objects for developing a voltage proportional to the degree of such disagreement, a thermionic relay having a control electrode connected in the output circuit of said responsive means, means for applying the output voltage of said relay to the driving motor to move the controlled object into positional agreement with the controlling object; second means responsive to a positional disagreement between said objects in excess of the said predetermined disagreement for developing a voltage, and means for preventing operation of said relay during a positional disagreement between said objects in excess of said predetermined disagreement and for impressing a voltage on said voltage-applying means to move the controlled object to said predetermined positional disagreement for assumption of control by said first responsive means.

8. In a control system for positioning a controlled object in accordance with a controlling object, the combination of a driving motor for the controlled object, means responsive to a predetermined positional disagreement between said objects for inducing a signal voltage corresponding in magnitude and direction to the magnitude and direction of such positional disagreement, a plurality of thermionic relays having plate circuits selectively controlling said driving motor, means for impressing said signal voltage on one or the other of said relays depending upon the direction of said positional disagreement for energizing the motor to drive the controlled object into positional agreement with the controlling object, means responsive to a positional disagreement between said objects in excess of the said predetermined positional disagreement for appropriating control of said relays to energize said motor to move the controlled object to said predetermined positional disagreement for assumption of control by said first responsive means, and means responsive to the rate of change of magnitude of said signal voltage for modifying the same to effect damping of the movement of the controlled object.

9. In a control system for positioning a controlled object in accordance with a controlling object, the combination of a driving motor for the controlled object, means responsive to a predetermined positional disagreement between said objects for developing a voltage proportional to the degree of such disagreement, a grid-controlled thermionic amplifier for said voltage, a plurality of thermionic rectifiers having plate circuits for controlling said driving motor, means for impressing the output of said amplifier on one or the other of said relays depending upon the direction of said positional disagreement for energizing the motor to drive the controlled object into positional agreement with the controlling object, second means responsive to a positional disagreement between said objects in excess of the said predetermined disagreement for developing a voltage, and means for impressing the voltage of said second responsive means on the grid circuit of said amplifier for blocking the same and on one or the other of said relays depending upon the direction of said excessive positional disagreement for energizing the motor to drive the controlled object to said predetermined positional disagreement for assumption of control by said first responsive means.

10. In a control system for positioning a controlled object in accordance with a controlling object, the combination of a driving motor for the controlled object, means responsive to a predetermined positional disagreement between said objects for developing a voltage proportional to the degree of such disagreement, a grid-controlled thermionic amplifier for said voltage, a plurality of thermionic rectifiers having plate circuits for controlling said driving motor, means for impressing the output of said amplifier on one or the other of said relays depending upon the direction of said positional disagreement for energizing the motor to drive the controlled object into positional agreement with the controlling object, second means responsive to a positional disagreement between said object in excess of the said predetermined disagreement for developing a voltage, means for impressing the voltage of said second responsive means on the grid circuit of said amplifier for blocking the same and on one or the other of said relays depending upon the direction of said excessive positional disagreement for energizing the motor to drive the controlled object to said predetermined positional disagreement for assumption of control by said first responsive means, and means responsive to the rate of change of magnitude of one of said voltages for varying said voltage to effect damping of the movement of the controlled object.

11. In a control system for positioning a controlled object in accordance with a controlling object, the combination of a driving motor for the controlled object, an electrical differential operatively connected jointly to said objects and responsive to a predetermined positional variation between them, a second electrical differential operatively connected jointly to said objects and responsive to a positional variation between them in excess of the said predetermined variation, an electrical controller normally actuated by said first differential for energizing said driving motor to position said controlled object in accordance with the movement of the controlling object, means actuated by said second differential for appropriating control of said controller to energize said driving motor to drive said controlled object to said predetermined positional variation for assumption of control by said first electrical differential, and means responsive to the rate of change of the response of one of said differentials for damping the movement of the controlled object.

12. In a control system for positioning a controlled object in accordance with a controlling object, the combination of a driving motor for the controlled object, an electrical differential operatively connected jointly to said objects and responsive to a predetermined positional variation between them, a second electrical differential operatively connected jointly to said objects and responsive to a positional variation between them in excess of the said predetermined variation, an electrical controller normally actuated by said first differential for energizing said driving motor to position said controlled object in accordance with the movement of the controlling object, means actuated by said second differential for appropriating control of said controller to energize said driving motor to drive said controlled object to said predetermined positional variation for assumption of control by said first electrical differential, and means responsive to the rate of change of the response of either of said differentials for regulating said controller to effect damping of the movement of the controlled object.

13. In a control system for positioning a controlled object in accordance with a controlling object, the combination of a driving motor for the controlled object, an electrical differential operatively connected jointly to said objects and responsive to a predetermined positional variation between them, a second electrical differential operatively connected jointly to said objects and responsive to a positional variation between them in excess of the said predetermined variation, a plurality of thermionic relays having plate circuits controlling said driving motor, means for impressing the output of said first differential on one or the other of said relays depending upon the direction of said predetermined positional variation to drive the controlled object into positional agreement with the controlled object, means responsive to the output of said second differential for appropriating control of said relays depending upon the direction of said excessive positional variation to drive the controlled object to said predetermined positional variation for assumption of control by said first differential, and means responsive to the rate of change of the response of one of said differentials for regulating the output thereof to effect damping of the movement of the controlled object.

14. In a control system for positioning a plurality of controlled objects in accordance with a controlling object, the combination of an electrical differential between each controlled object and the controlling object and responsive to relative displacement between the controlling object and the corresponding controlled object, power means for actuating each controlled object, control means between each differential and the corresponding power means for effecting positional agreement between each controlled object and the controlling object, and electrical load-balancing means between each differential and the corresponding control means for compensating for relative positional disagreements of the several controlled objects.

15. A device of the class described, comprising a controlling object, a plurality of controlled objects, means for effecting relative positional correspondence between said controlling object and said controlled objects within a predetermined difference of relative positions, means to take control and reduce differences of relative position to a value within said predetermined difference, means responsive to the rate of change of difference of relative position between said controlling object and any of said controlled objects to change the effort applied to effect relative positional correspondence in accordance with said rate of change and means to prevent the reaction of the position of one controlled object upon another controlled object.

GEORGE AGINS.